United States Patent
Zhang (10) Patent No.: US 11,678,678 B2
(45) Date of Patent: Jun. 20, 2023

(54) HIGH SOLUBILITY PEA PROTEIN COMPOSITION

(71) Applicant: CARGILL, INCORPORATED, Wayzata, MN (US)

(72) Inventor: Yifang Zhang, Beijing (CN)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 17/120,776

(22) Filed: Dec. 14, 2020

(65) Prior Publication Data

US 2021/0100262 A1 Apr. 8, 2021

Related U.S. Application Data

(63) Continuation of application No. 16/340,824, filed as application No. PCT/US2017/057102 on Oct. 18, 2017, now Pat. No. 10,863,755.

(Continued)

(30) Foreign Application Priority Data

Oct. 18, 2016 (CN) .......................... 201610907552.X (51) Int. Cl.
*A23J 3/14* (2006.01)
*A23J 3/34* (2006.01)
(Continued)

(52) U.S. Cl.
CPC . *A23J 3/14* (2013.01); *A23J 3/34* (2013.01); *A23L 33/18* (2016.08); *A23L 33/185* (2016.08);
(Continued)

(58) Field of Classification Search
CPC ........ A23L 33/18; A23L 33/19; A23L 33/185; A23V 2002/00; A23V 2250/548; A23V 2300/10; A23V 2300/26
See application file for complete search history.

(56) References Cited

U.S. PATENT DOCUMENTS 4,022,919 A 5/1977 Comer
4,234,620 A 11/1980 Howard
(Continued)

FOREIGN PATENT DOCUMENTS

CN 101917866 A 12/2010
CN 105685367 A 6/2016
CN 105828633 A 8/2016

OTHER PUBLICATIONS

Pharmza website. "Noyes Whitney Equation" 2011. https://pharmreza.wordpress.com/2011/09/19/noyes-whitney-equation/?msclkid=d841ecc0c2a111ec90d2eb317ca4b28e.*

(Continued)

*Primary Examiner* — Anthony J Weier (57) ABSTRACT

The present invention relates to the field of processing pea protein compositions. The present invention particularly relates to a method for preparing a high solubility pea protein composition and a product prepared thereby. The method of the present invention includes a step of subjecting a pea protein composition to high pressure homogenization. The method of the present invention significantly improves the solubility of pea protein compositions. The present invention further provides a pea protein composition prepared by the method, the pea protein composition having better solubility.

14 Claims, 7 Drawing Sheets

Related U.S. Application Data (60) Provisional application No. 62/412,539, filed on Oct. 25, 2016.

(51) Int. Cl.
 *A23L 33/18* (2016.01)
 *A23L 33/19* (2016.01)
 *A23L 33/185* (2016.01)

(52) U.S. Cl.
 CPC ........... *A23L 33/19* (2016.08); *A23V 2002/00* (2013.01); *A23V 2250/548* (2013.01); *A23V 2300/10* (2013.01); *A23V 2300/26* (2013.01)

(56) References Cited

U.S. PATENT DOCUMENTS

| | | | |
|---|---|---|---|
| 4,959,350 | A | 9/1990 | Frokjaer |
| 2008/0305212 | A1 | 12/2008 | Wong |
| 2011/0305740 | A1 | 12/2011 | Boursier |
| 2013/0017310 | A1 | 1/2013 | Dhalleine |
| 2013/0274324 | A1 | 10/2013 | Deng |
| 2013/0287912 | A1 | 10/2013 | De Waele |
| 2015/0237885 | A1 | 8/2015 | Boursier |
| 2016/0262412 | A1* | 9/2016 | Pedersen ................. A23L 19/09 |

OTHER PUBLICATIONS

Barac et al. International Journal of Molecular Sciences. 2011.pp. 8372-8387.

H. Fuhrmeister et al., "Impact of processing on functional properties of protein products from wrinkled peas", Journal of Food Engineering 56 (2003) 119-129.

Han-Ni Liang et al. "pH-dependent emulsifying properties of pea [*Pisum sativum* (L.)] proteins", Food Hydrocolloids 33 (2013) 309-319.

Noel A. McCarthy et al., "Emulsification properties of pea protein isolate using homogenization, microfluidization and ultrasonication", Food Research International 89 (2016) 415-421.

P.J. Shand et al., "Physicochemical and textural properties of heat-induced pea protein isolate gels", Food Chemistry 102 (2007) 1119-1130.

Stephanie Bader et al., "Can protein functionalities by enhanced by high-pressure homogenization?—A study on functional properties of lupin proteins", Procedia Food Science 1 (2011) 1359-1366.

Uken S. S. Soetrisno et al., "Functional Properties of Acid and Salt Extracted Proteins of Yellow Peas (*Pisum sativum* L. *Miranda*)", J. Agric. Food Chem. 1992, 40, 975-980.

Mo Chongwen, "Study on the Produetion of Pea Prolein and Starch", Journal of Zhengzhou Grain College, vol. 20, No. 4, Dec. 1999.

\* cited by examiner

HIGH SOLUBILITY PEA PROTEIN COMPOSITION

CROSS-REFERENCE TO RELATED APPLICATIONS

This application is a Continuation of U.S. patent application Ser. No. 16/340,824, filed Apr. 10, 2019, now U.S. Pat. No. 10,863,755, entitled HIGH SOLUBILITY PEA PROTEIN COMPOSITION AND METHOD OF PREPARING SAME, which is a national phase application of PCT/US2017/057102, filed Oct. 18, 2017, entitled METHOD FOR PREPARING HIGH SOLUBILITY PEA PROTEIN COMPOSTION AND PRODUCT PREPARED USING THE SAME, which claims priority to Chinese Application No. 201610907552.X, filed Oct. 18, 2016, entitled METHOD FOR PREPARING HIGH SOLUBILITY PEA PROTEIN COMPOSITION AND PRODUCT PREPARED USING THE SAME, and U.S. Provisional Application No. 62/412,539, filed Oct. 25, 2016, entitled METHOD FOR PREPARING HIGH SOLUBILITY PEA PROTEIN COMPOSITION AND PRODUCT PREPARED USING THE SAME, each of which are hereby incorporated by reference in their entirety.

TECHNICAL FIELD

The present invention relates to the field of processing pea protein compositions. The present invention particularly relates to a method for preparing a high solubility pea protein composition and a product prepared using the same.

BACKGROUND

Peas are a high-quality nutritional food rich in starch, protein and crude fiber. Pea protein is a nutritionally balanced vegetable protein rich in lysine and further comprising a variety of essential amino acids needed by the human body. The proportion value of amino acids in pea protein is relatively close to the value recommend by FAO/WHO. Pea protein is suitable for use as health products and as additive ingredients in foods or beverages (see MO Chongwen, Studies on the production of pea protein and starch, *Journal of Zhengzhou Grain College*, Vol. 20, No. 4, December 1999). However, current pea protein products suffer from severe problems in terms of solubility and flavor, and the market acceptance thereof is not high. The solubility of pea protein compositions is generally represented by a Nitrogen Solubility Index (NSI).

SUMMARY OF THE INVENTION

The present invention provides a method for preparing a high solubility pea protein composition and a product prepared using the same. The method according to the present invention comprises a step of subjecting a pea protein composition to high pressure homogenization, and further optionally comprises a step of flashing and/or drying. The method according to the present invention significantly improves the solubility of the pea protein composition. The present invention further provides a pea protein composition prepared by the method, the pea protein composition having better solubility. The pea protein composition obtained by the method of the present invention has a Nitrogen Solubility Index ("NSI") value greater than or equal to 88.0%, which satisfies industrial requirements for good solubility.

This application will be illustrated below through particular embodiments. These particular embodiments are all exemplary, but not restrictive.

DETAILED DESCRIPTION OF THE INVENTION

The present invention provides a method for preparing a high solubility pea protein composition, including subjecting a pea protein composition to high pressure homogenization to obtain a homogenized pea protein composition. In some embodiments, the high solubility pea protein composition according to the present invention has a nitrogen solubility index that is greater than or equal to 88.0%. In some embodiments, the homogenized pea protein composition obtained by the method according to the present invention has a nitrogen solubility index that is greater than or equal to 88.0%.

In some embodiments, the present invention provides a method for preparing a high solubility pea protein composition, including subjecting a pea protein composition to high pressure homogenization to obtain a homogenized pea protein composition, where the homogenized pea protein composition has a nitrogen solubility index that is greater than or equal to 88.0%.

In some embodiments, a pressure of the high pressure homogenization is from 5 MPa to 200 MPa, and more preferably from 40 MPa to 200 MPa.

In some embodiments, an operating temperature of the high pressure homogenization is from 10 to 70° C.

In some embodiments, the pea protein composition used in the method according to the present invention is a fluid containing a pea protein composition. More specifically, the fluid containing a pea protein composition described herein is typically created by dispersing a pea protein isolate, most often in the form of a powder, into a fluid. In some embodiments, the fluid is an aqueous fluid. In some embodiments, the fluid is a liquid, and preferably an aqueous liquid.

In some embodiments, subjecting the pea protein composition to high pressure homogenization in the method according to the present invention includes subjecting the fluid containing the pea protein composition to high pressure homogenization. In some embodiments, the fluid has a pH value from 4.4 to 10.0. In some embodiments, the fluid has a pH value from 4.4 to 10.0, and a pressure of the high pressure homogenization is from 5 MPa to 200 MPa.

In some embodiments, subjecting the pea protein composition to high pressure homogenization includes subjecting a fluid containing the pea protein composition to high pressure homogenization, where the fluid has a pH value from 4.4 to 10.0.

In some embodiments, the method according to the present invention further includes flashing the pea protein composition, where the high pressure homogenization is carried out before or after the flashing.

In some preferred embodiments, the present invention provides a method for preparing a high solubility pea protein composition, including subjecting a fluid containing the pea protein composition to high pressure homogenization and flashing, where the high pressure homogenization is carried out before or after the flashing.

In some embodiments, subjecting the pea protein composition to high pressure homogenization in the method according to the present invention includes subjecting a fluid containing the pea protein composition to high pressure homogenization, and the method further includes subjecting the fluid containing the pea protein composition to flashing, where the high pressure homogenization is carried out before or after the flashing.

In some preferred embodiments, the present invention provides a method for preparing a high solubility pea protein composition, including subjecting a fluid containing the pea protein composition to high pressure homogenization and flashing, where the high pressure homogenization is carried out before or after the flashing.

The flashing described herein refers to a liquid at a high pressure being introduced into a low pressure container (for example, a flash drum), and because the pressure is reduced suddenly, a portion of the liquid becomes saturated vapor and saturated liquid at the pressure in the container; and an operation of gas-liquid separation can be further carried out as required. Generally, flashing may be performed for a variety of purposes of separation, taste-masking (carrying away unpleasant odor through evaporation of liquid) and the like, as required.

In a further preferred embodiment, the method according to the present invention for preparing a high solubility pea protein composition includes subjecting a pea protein composition to high pressure homogenization to obtain a homogenized pea protein composition, where subjecting the pea protein composition to high pressure homogenization includes subjecting a fluid containing the pea protein composition to high pressure homogenization, and the fluid has a pH value from 4.4 to 10.0.

In a further preferred embodiment, the method according to the present invention for preparing a high solubility pea protein composition includes subjecting a fluid containing the pea protein composition to high pressure homogenization to obtain a homogenized pea protein composition, where a pressure of the high pressure homogenization is from 5 MPa to 200 MPa. In some further embodiments, subjecting the pea protein composition to high pressure homogenization includes subjecting a fluid containing the pea protein composition to high pressure homogenization, where the fluid has a pH value from 4.4 to 10.0.

In embodiments of the present invention, the method according to the present invention further optionally includes drying the homogenized pea protein composition treated according to the method described herein. In some embodiments, the drying includes spray drying and freeze drying. The dried homogenized pea protein composition is a powdered pea protein composition with high solubility.

In some embodiments, the pea protein composition used as the starting material for homogenization according to the present invention is a composition comprising at least 30 wt %, at least 40 wt %, at least 50 wt %, at least 60 wt %, at least 70 wt %, at least 80 wt %, or at least 90 wt % of pea protein, based on the dry weight of the (pea protein) composition. In some embodiments, the pea protein composition according to the present invention is a composition comprising 30 wt % to 100 wt % of pea protein based on the dry weight of the (pea protein) composition, for example, a composition comprising 30 wt %, 31 wt %, 32 wt %, 33 wt %, 34 wt %, 35 wt %, 36 wt %, 37 wt %, 38 wt %, 39 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 5 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 100 wt % of pea protein, based on the dry weight of the (pea protein) composition.

In some embodiments, the pea protein composition further comprises hydrolysates of enzyme hydrolysis and/or protein hydrolysis of the pea protein. In some embodiments, the pea protein composition does not comprise hydrolysates of enzyme hydrolysis and/or protein hydrolysis of the pea protein. In some embodiments, the pea protein composition according to the present invention is a commercially available isolated pea protein or pea protein concentrate.

The fluid as described in the present invention may be a liquid fluid with liquid as a carrier or a gaseous fluid with gas as a carrier. The fluid as described in the present invention containing a pea protein composition may be a fluid obtained by dissolving and/or dispersing the pea protein composition according to the present invention into a liquid carrier (solvent), which is preferably water, or into a gas carrier. The fluid containing the pea protein composition is preferably an aqueous liquid. The fluid containing the pea protein composition according to the present invention may also be a fluid containing the pea protein composition obtained by separating from a waste liquor from the production of pea starch, and the fluid is preferably an aqueous fluid.

In the embodiments, the pressure of the high pressure homogenization as described in the present invention is any value between, or any range constituted by any values between, 5 MPa and 200 MPa, 15 MPa and 200 MPa, 20 MPa and 200 MPa, 5 MPa and 100 MPa, 8 MPa and 50 MPa, and the like, for example, 5 MPa, 6 MPa, 7 MPa, 8 MPa, 9 MPa, 10 MPa, 11 MPa, 12 MPa, 13 MPa, 14 MPa, 15 MPa, 16 MPa, 17 MPa, 18 MPa, 19 MPa, 20 MPa, 21 MPa, 22 MPa, 23 MPa, 24 MPa, 25 MPa, 26 MPa, 27 MPa, 28 MPa, 29 MPa, 30 MPa, 31 MPa, 32 MPa, 33 MPa, 34 MPa, 35 MPa, 36 MPa, 37 MPa, 38 MPa, 39 MPa, 40 MPa, 41 MPa, 42 MPa, 43 MPa, 44 MPa, 45 MPa, 46 MPa, 47 MPa, 48 MPa, 49 MPa, 50 MPa, 55 MPa, 60 Ma, 65 MPa, 70 Ma, 75 MPa, 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, 165 MPa, 170 MPa, 175 MPa, 180 MPa, 185 MPa, 190 Ma, 195 MPa, and 200 MPa. The high pressure homogenization as described herein has a meaning common in the art. In general, the high pressure homogenization means that a fluid is passed through a narrow gap or orifice moduleunder ultra high pressure, typically (but not always)

above 10 MPa, and supersonic speed is formed by a rapid decrease in pressure which generates strong resultant action of shearing, impact and/or cavitation forces, so as to achieve homogenization effects. High pressure homogenization is usually carried out using a conventional method in the art, for example, it is carried out using a device such as a high pressure homogenizer, a colloid mill, or a shearing emulsion pump.

In the embodiments, the pressure of the high pressure homogenization as described in the present invention refers to the pressure in front of a homogenizing valve of a homogenizer.

The pH value of the fluid as described in the present invention containing the pea protein composition is any value within, or any range constituted by any values within, a range from 4.4 to 10.0, 7.0 to 10.0, or 7.2 to 10.0.

The pH value of the fluid as described in the present invention containing the pea protein composition may be 4.4, 4.5, 4.6, 4.7, 4.8, 4.6, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9 or 10.0. The pH value as described in the present invention is achieved by adding an acid or a base.

Acids that may be used include, but are not limited to, hydrochloric acid, sulfuric acid, nitric acid, phosphoric acid, acetic acid, tartaric acid, succinic acid, maleic acid, fumaric acid, gluconic acid, citric acid, malic acid, ascorbic acid, phosphoric acid, sorbic acid, benzoic acid, tannic acid, palmitinic acid, alginic acid, polyglutamic acid, polygalacturonic acid, acidic amino acid and the like. Bases that may be used include, but are not limited to, alkali metal hydroxide, for example, sodium hydroxide, and potassium hydroxide; alkaline earth metal hydroxide, for example, calcium hydroxide and magnesium hydroxide; and organic bases, for example, basic amino acid or N-methyl-D-glucosamine, potassium sorbate, and sodium benzoate.

The operating temperature of the high pressure homogenization as described in the present invention is any value within, or any range constituted by any values within, a range from 10 to 70° C. The operating temperature may be 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., or 70° C. The operating temperature is the temperature of the pea protein composition just before the homogenization step.

The high solubility pea protein composition according to the present invention refers to a pea protein composition treated by the method according to the present invention, in particular, treated by the high pressure homogenization.

The drying step as described in the present invention may be a drying step such as freeze drying or spray drying.

Beneficial effects of the present invention include that the method according to the present invention can significantly improve the solubility of a pea protein composition. Without being bound to any theory, it is believed that the high pressure homogenization effectively reduces the particle diameter of the pea protein composition consequently improving solubility. The particle diameter of the pea protein composition desirably is any value of 40 microns (μm) or below, for example 39 μm, 38 μm, 37 μm, 36 μm, 35 μm, 34 μm, 33 μm, 32 μm, 31 μm, 30 μm, 29 μm, 28 μm, 27 μm, 26 μm, 25 μm, 24 μm, 23 μm, 22 μm, 21 μm, 20 μm, 19 μm, 18 μm, 17 μm, 16 μm, 15 μm, 14 μm, 13 μm, 12 μm, 11 μm, 10 μm, 9 μm, 8 μm, 7 μm, 6 μm, 5 μm, 4 μm, 3 μm, 2 μm, and 1 μm, or more particularly any range constituted by any values between 12 μm and 40 μm. Particle diameter is determined using Malvern Laser Particle Size Analyzer, Model Malvern3000. The particle diameter is D [4.3].

The high solubility pea protein composition obtained by the method according to the present invention (a homogenized pea protein composition; —note "high solubility pea protein composition" and "homogenized pea protein composition" are used interchangeably herein) has an NSI value that is greater than or equal to 88.0%. For example, the high solubility pea protein composition obtained by the method according to the present invention (a homogenized pea protein composition) may have an NSI value that is any NSI value within, or any NSI range constituted by any values within a range between 88.0% and 98.0%, a range between 90.0% and 95.0%, or a range greater than or equal to 88.0%, for example, 88.0%, 88.1%, 88.2%, 88.3%, 88.4%, 88.5%, 88.6%, 88.7%, 88.8%, 88.9%, 89.0%, 89.1%, 89.2%, 89.3%, 89.4%, 89.5%, 89.6%, 89.7%, 89.8%, 89.9%, 90.0%, 90.1%, 90.2%, 90.3%, 90.4%, 90.5%, 90.6%, 90.7%, 90.8%, 90.9%, 91.0%, 91.1%, 91.2%, 91.3%, 91.4%, 91.5%, 91.6%, 91.7%, 91.8%, 91.9%, 92.0%, 92.1%, 92.2%, 92.3%, 92.4%, 92.5%, 92.6%, 92.7%, 92.8%, 92.9%, 93.0%, 93.1%, 93.2%, 93.3%, 93.4%, 93.5%, 93.6%, 93.7%, 93.8%, 93.9%, 94.0%, 94.1%, 94.2%, 94.3%, 94.4%, 94.5%, 94.6%, 94.7%, 94.8%, 94.9%, 95.0%, 95.1%, 95.2%, 95.3%, 95.4%, 95.5%, 95.6%, 95.7%, 95.8%, 95.9%, 96.0%, 96.1%, 96.2%, 96.3%, 96.4%, 96.5%, 96.6%, 96.7%, 96.8%, 96.9%, 97.0%, 97.1%, 97.2%, 97.3%, 97.4%, 97.5%, 97.6%, 97.7%, 97.8%, 97.9%, 98.0%, 98.1%, 98.2%, 98.3%, 98.4%, 98.5%, 98.6%, 98.7%, 98.8%, 98.9%, 99.0%, 99.1%, 99.2%, 99.3%, 99.4%, 99.5%, 99.6%, 99.7%, 99.8%, 99.9%, 100.0%, etc.

The present invention further provides a pea protein composition product, where the pea protein composition has an NSI value that is greater than or equal to 88.0%. For example, the NSI of the pea protein composition may be any NSI value within, or any NSI range constituted by any values within, a range greater than or equal to 88.0%, for example, 88.0%, 88.1%, 88.2%, 88.3%, 88.4%, 88.5%, 88.6%, 88.7%, 88.8%, 88.9%, 89.0%, 89.1%, 89.2%, 89.3%, 89.4%, 89.5%, 89.6%, 89.7%, 89.8%, 89.9%, 90.0%, 90.1%, 90.2%, 90.3%, 90.4%, 90.5%, 90.6%, 90.7%, 90.8%, 90.9%, 91.0%, 91.1%, 91.2%, 91.3%, 91.4%, 91.5%, 91.6%, 91.7%, 91.8%, 91.9%, 92.0%, 92.1%, 92.2%, 92.3%, 92.4%, 92.5%, 92.6%, 92.7%, 92.8%, 92.9%, 93.0%, 93.1%, 93.2%, 93.3%, 93.4%, 93.5%, 93.6%, 93.7%, 93.8%, 93.9%, 94.0%, 94.1%, 94.2%, 94.3%, 94.4%, 94.5%, 94.6%, 94.7%, 94.8%, 94.9%, 95.0%, 95.1%, 95.2%, 95.3%, 95.4%, 95.5%, 95.6%, 95.7%, 95.8%, 95.9%, 96.0%, 96.1%, 96.2%, 96.3%, 96.4%, 96.5%, 96.6%, 96.7%, 96.8%, 96.9%, 97.0%, 97.1%, 97.2%, 97.3%, 97.4%, 97.5%, 97.6%, 97.7%, 97.8%, 97.9%, 98.0%, 98.1%, 98.2%, 98.3%, 98.4%, 98.5%, 98.6%, 98.7%, 98.8%, 98.9%, 99.0%, 99.1%, 99.2%, 99.3%, 99.4%, 99.5%, 99.6%, 99.7%, 99.8%, 99.9%, 100.0%, etc.

In the embodiments, the NSI value of the pea protein composition according to the present invention can be determined by the Kjeldahl nitrogen determination method from the PRC National Standard GB5009.5-2010 (National Food Safety Standard—Determination of protein in foods, released on Mar. 26, 2010, and implemented on Jun. 1, 2010).

In some embodiments, components other than pea protein in the pea protein composition according to the present invention comprise non-pea protein components such as polysaccharides and ash contents. In general, the non-pea protein components in the pea protein composition according to the present invention have no effect on the nitrogen solubility index of the pea protein composition. In some embodiments, the nitrogen solubility index of the pea protein composition according to the present invention does not change with the changes in contents of the non-pea protein components in the pea protein composition.

The present invention further provides a composition comprising the high solubility pea protein composition according to the present invention, which is also referred to as the pea protein composition according to the present invention for simplicity.

The high solubility pea protein composition of all embodiments of the present invention can be used to prepare foods, feeds, cosmetics, drugs, dietary supplements for example meat products, flour products, dairy products, beverage products for example functional beverages.

Examples

Material and Method
1. Main Experimental Material
A pea protein isolate (an isolated pea protein (protein 80%) commercially available from Yantai Oriental Protein Technology Co., Ltd.); sodium hydroxide (NaOH), analytically pure; deionized water.
2. Main Experimental Instrument and Device
A pH meter; a 2000-ml jacketed beaker; a stirrer; a high pressure homogenizer, model APV 1000; a freeze drier; a constant-temperature hot water circulator; a laser particle size analyzer; a texture analyzer; an FOSS automatic Kjeldahl nitrometer.
3. Experimental Method
3.1 Homogenization of Pea Protein Composition
440 g of the pea protein isolate was added into a container, and then deionized water was added therein and stirred, to disperse the pea protein isolate, thereby formulating 4000 ml of a fluid containing a pea protein composition. The fluid containing the pea protein composition was heated to 60° C., and adjusted to pH 7.2 with NaOH. The fluid containing the pea protein composition at pH 7.2 was divided equally into 16 portions, with 250 ml in each portion, labeled respectively as Samples 1 to 16.

Sample 1 was a control group that was not subjected to high pressure homogenization, and Samples 2 to 10 were treatment groups that were subjected to high pressure homogenization at pressures of 1 MPa, 2 MPa, 3 MPa, 4 MPa, 5 MPa, 6 MPa, 7 MPa, 8 MPa, 9 MPa, 10 MPa, 15 MPa, 20 MPa, 30 MPa, 40 MPa and 50 MPa, respectively.

Lastly, Samples 1 to 16 were freeze dried, to obtain a dry control pea protein composition from Sample 1 and dry high solubility pea protein compositions from Samples 2 to 16.

3.2 Detection of Nitrogen Solubility Index (NSI)
The dry control pea protein composition from Sample 1 and the dry high solubility pea protein compositions from Samples 2 to 16 were formulated as liquids of Samples 1 to 16 respectively.

Each 20 ml of the Samples 1 to 16 were drawn respectively, and each was brought up to a final volume into a 100-ml volumetric flask. After mixed intimately, 10 ml was precisely drawn with a pipette, to serve as a total nitrogen determination solution for Samples 1 to 16, and was transferred into a 250-ml nitrogen determination flask for determination. After the remaining fluid was stood still for 1 to 2 min, a supernatant of the fluid of Samples 1 to 16 in the volumetric flask was transferred into a centrifuge tube. The fluid was centrifuged for 10 min in a centrifuge at a rotation rate of 1500 rpm, to obtain a centrifugate of Samples 1 to 16. The centrifugate of Samples 1 to 16 was filtered through a rapid filter paper (or alternatively a glass fiber), to obtain a clear filtrate of Samples 1 to 16. The clear filtrate of Samples 1 to 16 was placed into a conical flask, to serve as a water-soluble nitrogen determination solution of Samples 1 to 16. 10 ml of the water-soluble nitrogen determination solution of Samples 1 to 16 was drawn precisely with a pipette, and transferred into a 250-ml nitrogen determination flask. Contents of water-soluble nitrogen and total nitrogen were determined employing respectively a method consistent with the first method (Kjeldahl nitrogen determination method) in PRC National Standard GB5009.5-2010 (National Food Safety Standard—Determination of protein in foods, released on Mar. 26, 2010, and implemented on Jun. 1, 2010), with particular steps as follows:

Treatment of the samples: 0.2 g of copper sulfate, 6 g of potassium sulfate and 20 ml of sulfuric acid were added into the nitrogen determination flask with the determination solution added therein, jiggled, and placed into a digestion furnace for digestion. The mixture was heated carefully. When the contents were entirely charred and foaming was completely stopped, the temperature was enhanced, and the fluid within the flask was maintained boiling slightly. When the fluid appeared blue green in color as well as clear and transparent, heating was further carried out for 0.5 h to 1 h. The fluid was taken down and cooled down, and 20 ml of water was carefully added therein. After cooled down, the fluid was transferred into a 250-ml volumetric flask, and the nitrogen determination flask was washed with a small amount of water. The wash solution was incorporated into the volumetric flask, followed by addition of water to the scale. The resultant was intimately mixed for later use. Reagent blank tests were carried out at the same time.

Determination: determination was carried out using an FOSS automatic Kjeldahl nitrometer (model 2300). Before the device was switched on, cooling water was turned on, and then the power was switched on, to wait for self-correction of the instrument. After the self-correction, a "measurement mode" was selected. "PROGRAM 2" was selected to carry out a cleaning procedure. Empty test tubes were placed into the instrument, and hermetic placement thereof was ensured. After stabilization, the hermetic door was pulled down and closed, to automatically activate the cleaning procedure. The operation was repeated multiple times, until "N %" was showed to be 0 on the instrument. After the cleaning procedure, the test tubes were replaced with test tubes of blank sample. "PROGRAM 3" in the panel was selected, and then "Blank" was selected to carry out test procedure on the blank samples. The hermetic door was pulled down, and the procedure was automatically activated. After the test procedure of the blank samples, the test tubes were replaced with test tubes of samples. Determination of nitrogen contents was selected, and the volume of the sample to be treated was input. The hermetic door was pulled down, and the measuring procedure was activated. After the measurement, measurement results would be shown on the instrument panel. The total nitrogen content (g/100 ml) and the water-soluble nitrogen content (g/100 ml) of Samples 1 to 16 were determined respectively, using the total nitrogen determination solution and the water-soluble nitrogen determination solution of Samples 1 to 16.

NSI values of Samples 1 to 16 are calculated according to following formula:

% NSI=(water-soluble nitrogen content)/(total nitrogen content)×100.

3.3 Detection of Particle Diameter 2 g of the dry control pea protein composition from Sample 1 and 2 g of the dry high solubility pea protein composition from Samples 2 to 16 were formulated respectively as a 40-ml solution at a concentration of 5%. The respective particle diameters of Samples 1 to 16 were determined using a laser particle size analyzer.

4. Result and Discussion 4.1 Test results of NSIs and particle diameters of the homogenized pea protein composition sample and the non-homogenized pea protein composition sample are summarized in Table 1.

TABLE 1 summary of test results

| Sample | Homo pressure, (MPa) | NSI, % (at pH 6.5-7.5) | Particle diameter (µm) |
|---|---|---|---|
| 1 | 0 | 13.60 | 125 |
| 2 | 1 | 33.43 | 94 |
| 3 | 2 | 30.80 | 60.3 |
| 4 | 3 | 64.13 | 38.7 |
| 5 | 4 | 61.02 | 37.6 |
| 6 | 5 | 76.40 | 32.1 |
| 7 | 6 | 81.95 | 22.9 |
| 8 | 7 | 92.40 | 22.9 |
| 9 | 8 | 90.87 | 24.3 |
| 10 | 9 | 99.62 | 22.2 |
| 11 | 10 | 91.58 | 18.3 |
| 12 | 15 | 98.07 | 14.9 |
| 13 | 20 | 100.21 | 16.7 |
| 14 | 30 | 108.03 | 14.7 |
| 15 | 40 | 102.79 | 7.64 |
| 16 | 50 | 101.88 | 7.09 |

4.2 Improvement in Solubility Represented by Nitrogen Solubility Index (NSI)

Figure 1:
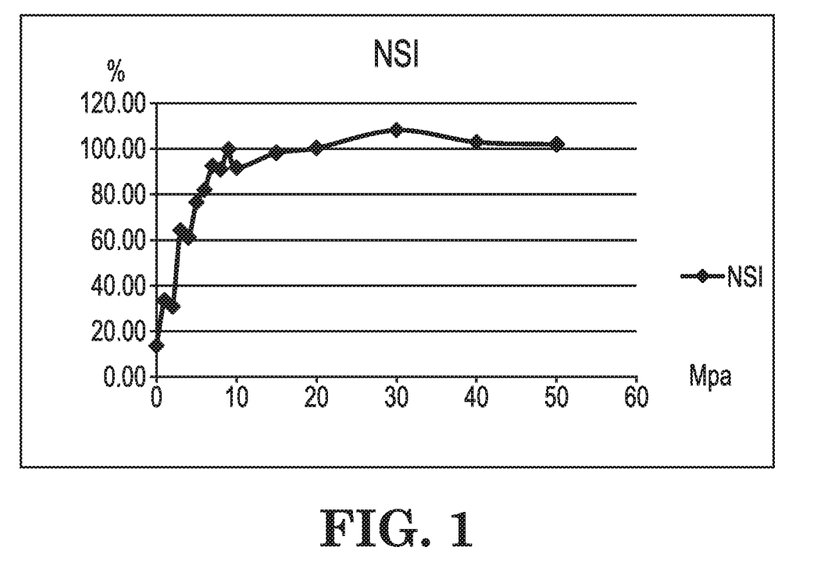
FIG. 1 is a graphical representation of NSIs of a pea protein composition obtained at various homogenization pressures.

As can be seen from the detection results that, the pea protein composition sample that was not subjected to high pressure homogenization has an NSI of 13.60%. Whereas the pea protein composition sample that was subjected to high pressure homogenization has an NSI improved with the increase in the homogenization pressure. It was also observed that when the homogenization pressure reaches about 10 MPa, the NSI has a slight decline and then rises again. When the homogenization pressure reached 20 MPa, the NSI was close to 100%. As can be seen from the experimental results that, high pressure homogenization significantly improves solubility of the pea protein composition. Nitrogen solubility indexes at various homogenization pressures are graphically represented in FIG. 1.

4.3 Change in Particle Diameter

Figure 2:
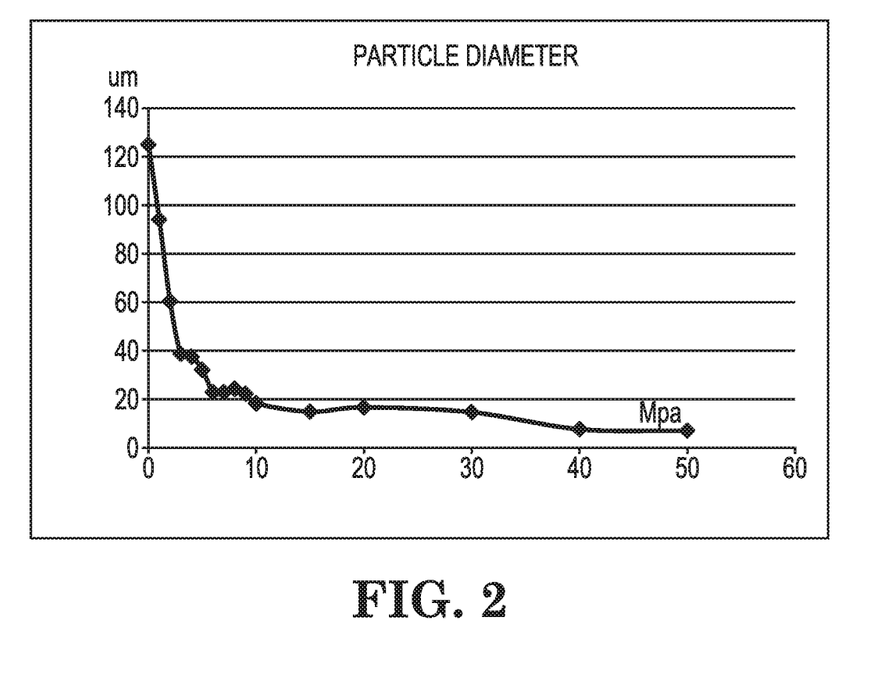
FIG. 2 is a graphical representation of particle diameters of a pea protein composition obtained at various homogenization pressures.

As can be seen from the experimental results that, after the high pressure homogenization, the particle diameter of the pea protein composition was significantly decreased. Also, the particle diameter of the pea protein composition was decreased gradually with the increase in homogenization pressure. Particle diameters at various homogenization pressures are graphically represented in FIG. 2.

Decrease in the particle diameter of the pea protein composition facilitates the improvement in solubility and mouth feel.

5. Influence of Modification by High Pressure Homogenization on the Secondary Structure of Pea Protein The secondary structure of protein refers to a local space structure of a backbone of a polypeptide chain Common secondary structures include structural units of: regular structures such as alpha helixes and beta folds; quasi-regular structures such as beta turns; and irregular coil structures, etc. Fourier transformation infrared spectrum (FT-IR for short hereafter) belongs to a molecular vibration absorption spectrum, and is a method commonly used for detecting secondary structures of proteins. Infrared absorption spectra of proteins mainly consist of a series of amide absorption bands, including amide I to VII as well as A and B bands. A spectral region that is the most sensitive to the secondary structures of proteins is amide I band (1700 to 1600 cm$^{-1}$), which is nearly completely generated by stretching vibration of C=O. Therefore, the infrared spectrum amide I band comprises information on the composition of secondary structures of proteins. In this application, it is confirmed, by quantitative analysis of structural units of secondary structures of protein in the infrared spectrum amide I band, the changes in the secondary structure of pea protein in the pea protein composition caused by the treatment of high pressure homogenization.

5.1 Material and Device

The dry control pea protein composition of Sample 1 (a control group not subjected to high pressure homogenization), the dry high solubility pea protein composition of Sample 6 (a treatment group subjected to high pressure homogenization at a pressure of 10 MPa), the dry high solubility pea protein composition of Sample 7 (a treatment group subjected to high pressure homogenization at a pressure of 20 MPa), the dry high solubility pea protein composition of Sample 8 (a treatment group subjected to high pressure homogenization at a pressure of 30 MPa), and the dry high solubility pea protein composition of Sample 9 (a treatment group subjected to high pressure homogenization at a pressure of 40 MPa). Potassium bromide (KBr), spectroscopically pure.

Infrared spectrometer, FT-IR, NICOLET iS10, Thermo Fisher Scientific Inc.

5.2 Experimental Method 1.5 mg of each pea protein composition sample and 200 mg of KBr were fully ground in an agate mortar, oven dried at 100° C., placed into a dryer and cooled for later use. Tabletting was carried out in a powder compressing machine at a pressure of 9 to 10 t. Pure KBr tablets were prepared by using the same method.

The pure KBr tablets were determined using the infrared spectrometer to read background. Tablets containing the sample were determined and the background was subtracted, to obtain an amide I band, i.e., an infrared spectrum from 1700 to 1600 cm$^{-1}$.

The infrared spectrum obtained was analyzed using OMNIC Software. After autocorrection of the baseline, peaks were labeled, and the corrected peak area of each peak was measured, with data obtained shown as follows.

5.3 Result and Discussion

Infrared spectrum and corrected peak area proportion of each sample are calculated as detailed in Table 2.

Infrared spectrum data of Sample 1 (a control group not subjected to high pressure homogenization)

TABLE 2

| | Wave number, cm$^{-1}$ | Proportion based on the total area, % | Assignment |
|---|---|---|---|
| 1 | 1684.06 | 18.80 | β-Turn |
| 2 | 1675.11 | 4.09 | β-sheet |
| 3 | 1669.62 | 7.90 | β-Turn |
| 4 | 1662.46 | 5.18 | β-Turn |
| 5 | 1653.18 | 21.80 | α-Helix |
| 6 | 1646.84 | 11.17 | Random coil |
| 7 | 1635.70 | 15.80 | β-sheet |
| 8 | 1623.67 | 8.72 | β-sheet |
| 9 | 1617.15 | 6.54 | β-sheet |

Figure 3:
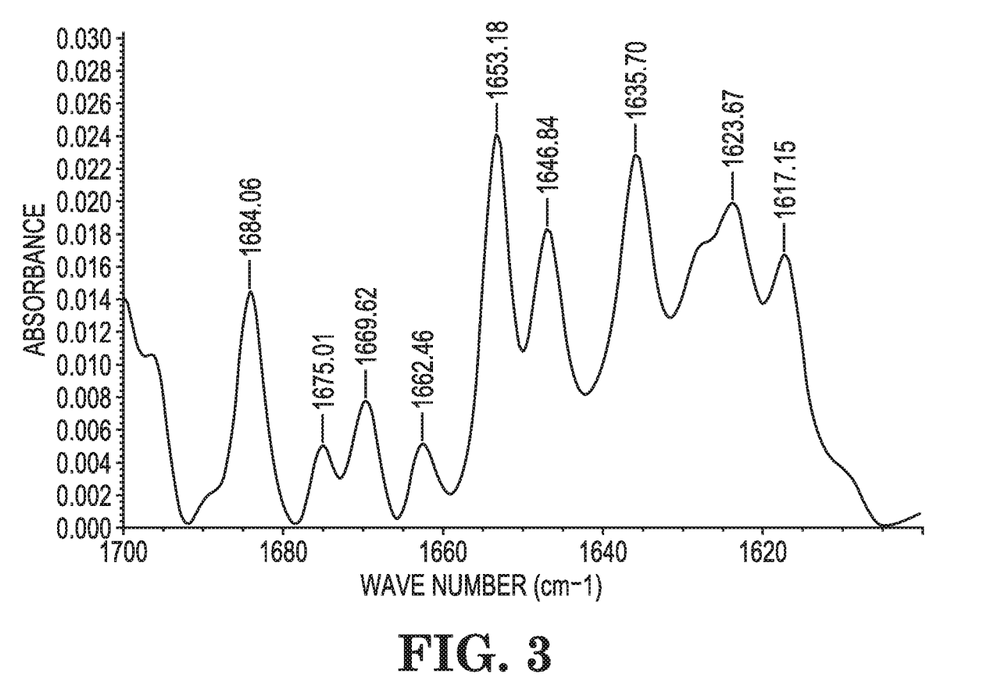
FIG. 3 is a diagram of infrared spectrum amide I bands of Sample 1.

An infrared spectrogram of Sample 1 is as shown in FIG. 3.

Infrared spectrum data of Sample 6 (a treatment group subjected to high pressure homogenization at a pressure of 10 MPa) is detailed in Table 3.

TABLE 3

| | Wave number, cm$^{-1}$ | Proportion based on the total area, % | Assignment |
|---|---|---|---|
| 1 | 1698.13 | 5.02 | β-sheet |
| 2 | 1694.69 | 5.95 | β-sheet |
| 3 | 1688.31 | 3.25 | β-Turn |
| 4 | 1682.77 | 17.10 | β-Turn |
| 5 | 1673.86 | 4.93 | β-sheet |
| 6 | 1668.24 | 7.99 | β-Turn |
| 7 | 1661.19 | 6.13 | β-Turn |
| 8 | 1651.91 | 16.91 | α-Helix |
| 9 | 1645.75 | 9.48 | Randomcoil |
| 10 | 1634.54 | 10.13 | β-sheet |
| 11 | 1621.93 | 7.53 | β-sheet |
| 12 | 1615.81 | 5.58 | v-sheet |

Figure 4:
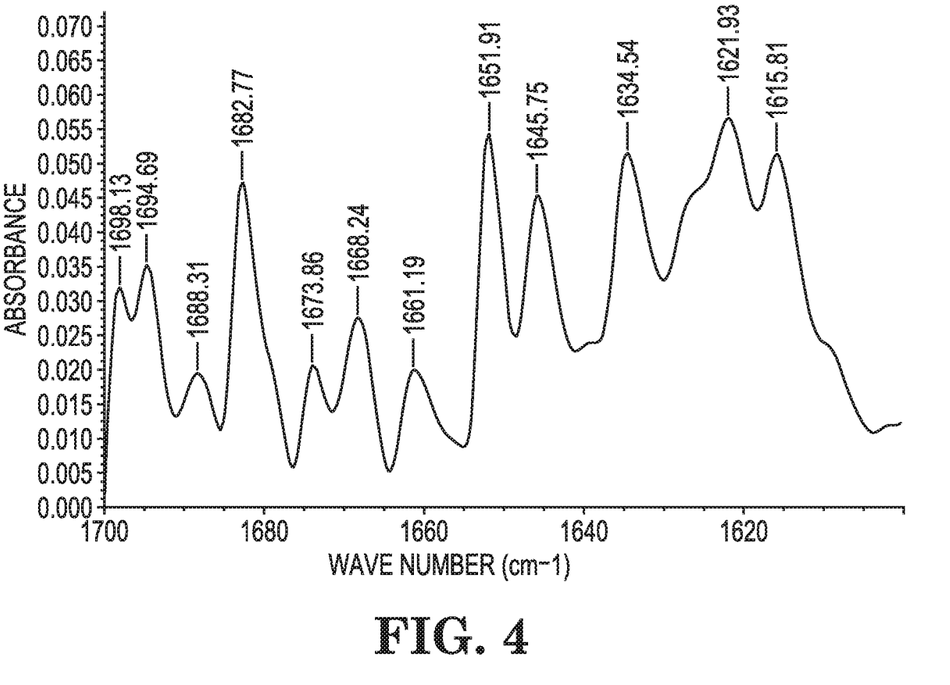
FIG. 4 is a diagram of infrared spectrum amide I bands of Sample 6.

An infrared spectrogram of Sample 6 is as shown in FIG. 4

Infrared spectrum data of Sample 7 (a treatment group subjected to high pressure homogenization at a pressure of 20 MPa) is detailed in Table 4.

TABLE 4

| | Wave number, cm$^{-1}$ | Proportion based on the total area, % | Assignment |
|---|---|---|---|
| 1 | 1696.96 | 5.56 | β-sheet |
| 2 | 1685.14 | 12.39 | β-Turn |
| 3 | 1676.15 | 4.70 | β-sheet |
| 4 | 1670.83 | 7.26 | β-Turn |
| 5 | 1663.55 | 5.13 | β-Turn |
| 6 | 1654.17 | 20.51 | α-Helix |
| 7 | 1647.86 | 14.10 | Random coil |
| 8 | 1636.87 | 14.53 | β-sheet |
| 9 | 1624.33 | 4.70 | β-sheet |
| 10 | 1617.91 | 8.97 | β-sheet |
| 11 | 1611.69 | 2.14 | β-sheet |

Figure 5:
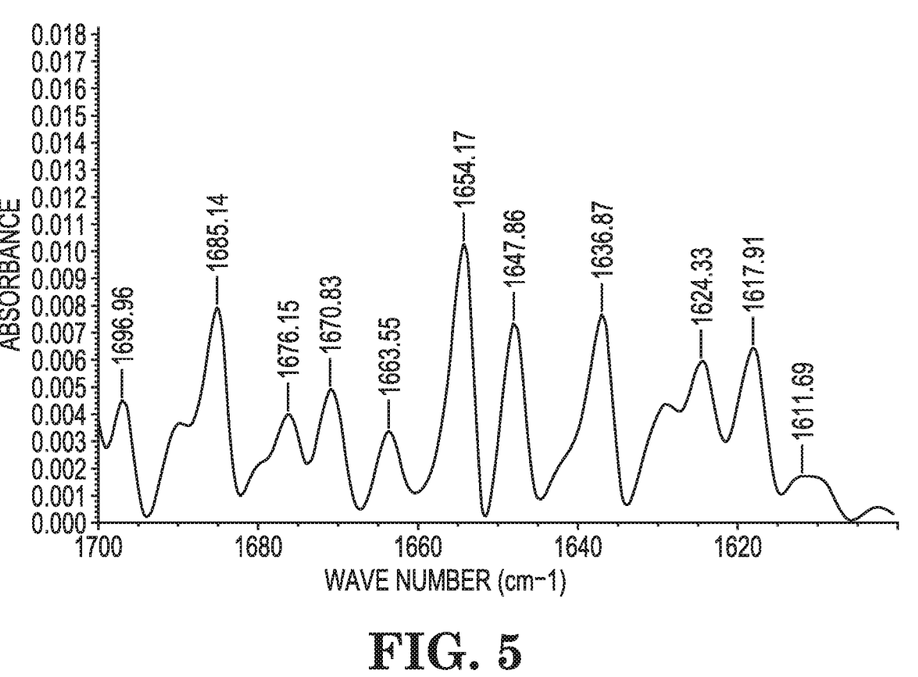
FIG. 5 is a diagram of infrared spectrum amide I bands of sample 7.

An infrared spectrogram of Sample 7 is as shown in FIG. 5.

Infrared spectrum data of Sample 8 (a treatment group subjected to high pressure homogenization at a pressure of 30 MPa) is detailed in Table 5.

TABLE 5

| | Wave number, cm$^{-1}$ | Proportion based on the total area, % | Assignment |
|---|---|---|---|
| 1 | 1696.97 | 5.78 | β-sheet |
| 2 | 1685.19 | 11.56 | β-Turn |
| 3 | 1676.19 | 4.62 | β-sheet |
| 4 | 1670.77 | 6.94 | β-Turn |
| 5 | 1663.63 | 5.49 | β-Turn |
| 6 | 1654.24 | 19.08 | α-Helix |
| 7 | 1647.81 | 13.87 | Random coil |
| 8 | 1636.88 | 13.58 | β-sheet |
| 9 | 1628.68 | 2.60 | β-sheet |
| 10 | 1624.20 | 4.62 | β-sheet |
| 11 | 1617.91 | 9.25 | β-sheet |
| 12 | 1611.63 | 2.60 | β-sheet |

Figure 6:
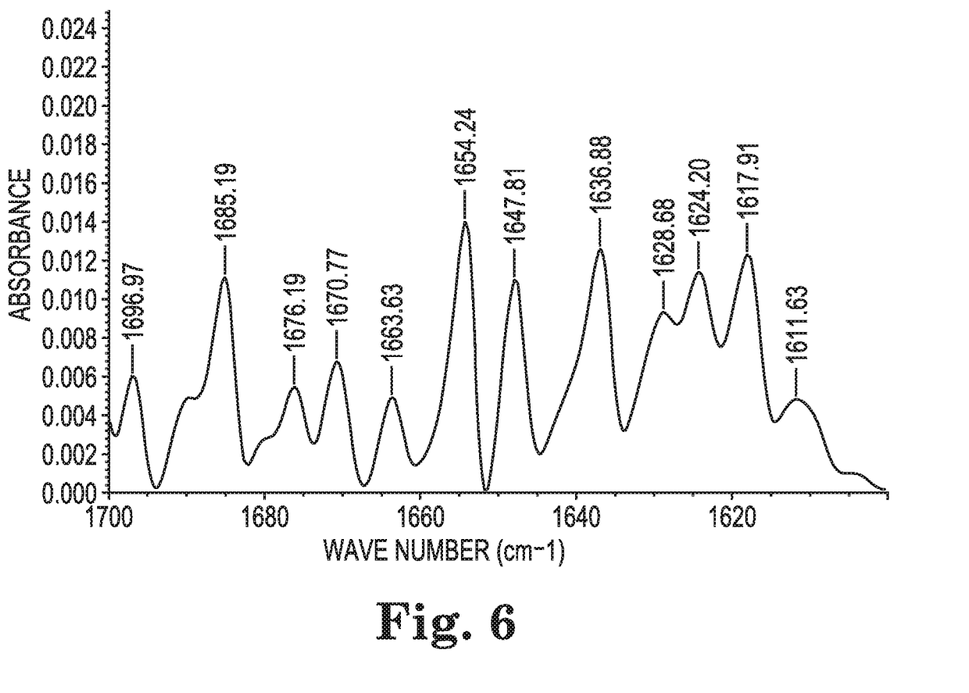
FIG. 6 is a diagram of infrared spectrum amide I bands of sample 8.

Infrared spectrum data of Sample 8 is as shown in FIG. 6.

Infrared spectrum data of Sample 9 (a treatment group subjected to high pressure homogenization at a pressure of 40 MPa) is detailed in Table 6.

TABLE 6

| | Wave number, cm$^{-1}$ | Proportion based on the total area, % | Assignment |
|---|---|---|---|
| 1 | 1697.36 | 9.74 | β-sheet |
| 2 | 1683.39 | 18.76 | β-Turn |
| 3 | 1674.32 | 2.90 | β-sheet |
| 4 | 1669.54 | 8.39 | β-Turn |
| 5 | 1662.19 | 5.08 | β-Turn |
| 6 | 1652.69 | 14.40 | α-Helix |
| 7 | 1646.69 | 11.92 | Random coil |
| 8 | 1635.60 | 13.16 | β-sheet |
| 9 | 1623.03 | 8.91 | β-sheet |
| 10 | 1617.13 | 6.74 | β-sheet |

Figure 7:
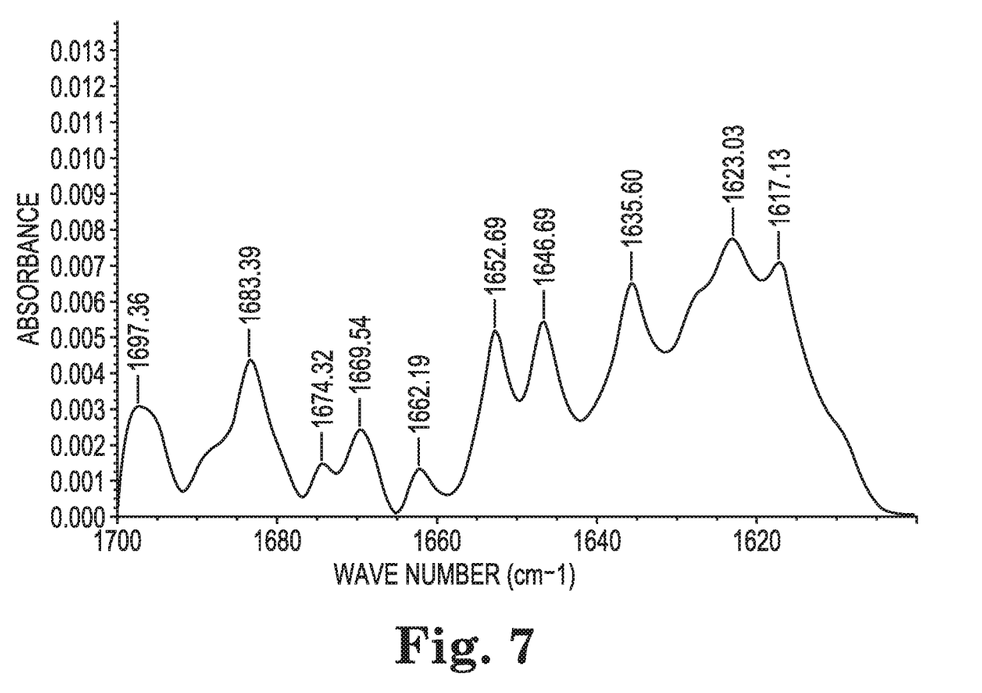
FIG. 7 is a diagram of infrared spectrum amide I bands of sample 9.

An infrared spectrogram of Sample 9 is as shown in FIG. 7.

Proportions of structural units in secondary structures of Samples 1 and 6 to 9 are shown in Table 7.

TABLE 7

| Sample name | Homogenization pressure, MPa | α-Helix, % | β-Turn, % | β-sheet, % | Random coil, % | Peak number |
|---|---|---|---|---|---|---|
| 1 | 0 | 21.8 | 31.9 | 35.1 | 11.2 | 9 |
| 6 | 10 | 16.9 | 34.5 | 39.1 | 9.5 | 12 |
| 7 | 20 | 20.5 | 24.8 | 40.6 | 14.1 | 11 |
| 8 | 30 | 19.1 | 24 | 43 | 13.9 | 12 |
| 9 | 40 | 14.4 | 32.2 | 41.5 | 11.9 | 10 |

As can be seen from the comparison of infrared spectrum amide I bands (1700 cm$^{-1}$ to 1600 cm$^{-1}$) of various pea protein samples that:

In infrared spectra of pea protein Samples 6 to 9 subjected to the treatment of high pressure homogenization, the number of peaks appearing within a range of the amide I band is increased as compared with that of the pea protein Sample 1 not subjected to the treatment of high pressure homogenization, indicating that the secondary structure of pea protein after the treatment of high pressure homogenization is changed.

The change in the secondary structure of protein will lead to significant changes in functional properties thereof.

The above newly added peaks (i.e. infrared spectra formed by the secondary structures newly appeared) all appear on both ends of the amide I band. Structures appearing in these regions generally belong to structures in β conformation, i.e., β-sheets or β-turns.

Quantitative analysis of the secondary structures indicate that, in secondary structures of pea protein subjected to the treatment of high pressure homogenization, the proportion of β-sheets is increased significantly, which is beneficial for the improvement in solubility.

5.4 Observations

The treatment of high pressure homogenization brings about significant changes to the secondary structure of pea protein. The proportion of structures in beta conformation is increased, leading to significant changes in functional properties.

The homogenization technique is used in the production of soybean protein isolates mainly for the purpose of improving gelation of the product. Soybean protein generally has very good solubility, but a pea protein composition generally has poor solubility. The low solubility directly influences the usable range of the pea protein composition in the food field. Improvement of solubility is a primary purpose of the studies on pea protein compositions.

As can be seen from the experimental results of the present invention that, high pressure homogenization can significantly improve the solubility of pea protein compositions, to solve the technical problem of low solubility of pea protein compositions.

High pressure homogenization also changes the secondary structure of pea protein in the pea protein composition.

It is believed that high pressure homogenization changes pea protein compositions in multiple respects, for example particle diameter, thereby contributing to the improvement of the solubility of pea protein compositions.

The invention claimed is:

1. A pea protein composition comprising a homogenized pea protein, wherein the pea protein composition has a nitrogen solubility index that is greater than or equal to 88.0% and a particle diameter D[4,3] of 40 microns or below, and wherein non-pea protein components of the pea protein composition do not affect the nitrogen solubility index of the pea protein composition.

2. The composition of claim 1, wherein the particle diameter D [4,3] of the composition is 35 microns or below.

3. The composition of claim 1, wherein the particle diameter D [4,3] of the composition is 30 microns or below.

4. The composition of claim 1, wherein the particle diameter D [4,3] of the composition is 25 microns or below.

5. The composition of claim 1, wherein the particle diameter D [4,3] of the composition is 20 microns or below.

6. The composition of claim 1, wherein the particle diameter D [4,3] of the composition is 15 microns or below.

7. The composition of claim 1, wherein the particle diameter D [4,3] of the composition is 10 microns or below.

8. The composition of claim 1, wherein the particle diameter D [4,3] of the composition is in the range of 12 μm-40 μm.

9. The composition of claim 1, wherein the nitrogen solubility index of the composition is greater than or equal to 90.0%.

10. The composition of claim 1, wherein the nitrogen solubility index of the composition is greater than or equal to 95.0%.

11. The composition of claim 1, wherein the nitrogen solubility index of the composition is greater than or equal to 97.0%.

12. The composition of claim 1, wherein the pH value of the composition is in the range of 4.4 to 10.0 when the composition is dispersed in an aqueous liquid.

13. The composition of claim 1, wherein the pH value of the composition is in the range of 7.0 to 10.0 when the composition is dispersed in an aqueous liquid.

14. The composition of claim 1, wherein the composition is a homogenized pea protein composition.

* * * * *